W. R. DENMAN.
CORE FOR USE IN CURING PNEUMATIC TIRES.
APPLICATION FILED APR. 24, 1920.

1,380,537.

Patented June 7, 1921.

Inventor
W. R. Denman,
By Watson, Coit, Moorse & Grindle
Attorneys.

UNITED STATES PATENT OFFICE.

WALTER R. DENMAN, OF CLEVELAND, OHIO.

CORE FOR USE IN CURING PNEUMATIC TIRES.

1,380,537.  Specification of Letters Patent.  Patented June 7, 1921.

Application filed April 24, 1920. Serial No. 376,359.

*To all whom it may concern:*

Be it known that I, WALTER R. DENMAN, a citizen of the United States, and residing at Cleveland, Cuyahoga county, Ohio, have invented certain new and useful Improvements in Cores for Use in Curing Pneumatic Tires, of which the following is a specification.

The present invention relates to cores for use in the vulcanizing or curing of pneumatic tires.

In the manufacture of cord and pneumatic tires when an air bag alone is used to act as a core in the vulcanizing operation it is found that the beads are often irregular and not properly formed. To overcome this defect a heavy solid ring, such as shown in the patents to Tew, No. 1,137,097, and Johnson *et al.*, No. 1,177,112, has been used between the beads, the air bag being employed to form the remainder of the interior of the tire. It is found, however, that pressure exerted on the beads between said ring and the mold causes a flow of the gum out from the bead, forming annular ridges on the interior of the tire at the outside lateral edges of the ring. Where a chafing strip is employed, it is humped up with the ridges. Of course such ridges would injure the inner tube and consequently must be trimmed away to insure a smooth surface on the interior of the tire for the inner tube. This trimming operation usually weakens the chafing strip because more or less of the same is cut away. Not only is there the expense of the trimming operation mentioned above, but the labor of handling the heavy rings is considerable.

The principal object of the present invention is to eliminate the formation of the ridges mentioned above and also cut down the expense due to handling the heavy rings. To these ends the invention consists in providing a core consisting of an air bag having a member at its inner periphery of light construction and affording means for forming the interior surfaces of the beads, which means is not as rigid and unyielding as the old solid rings, nor as flexible and yielding as the air bag alone.

Figure 1:
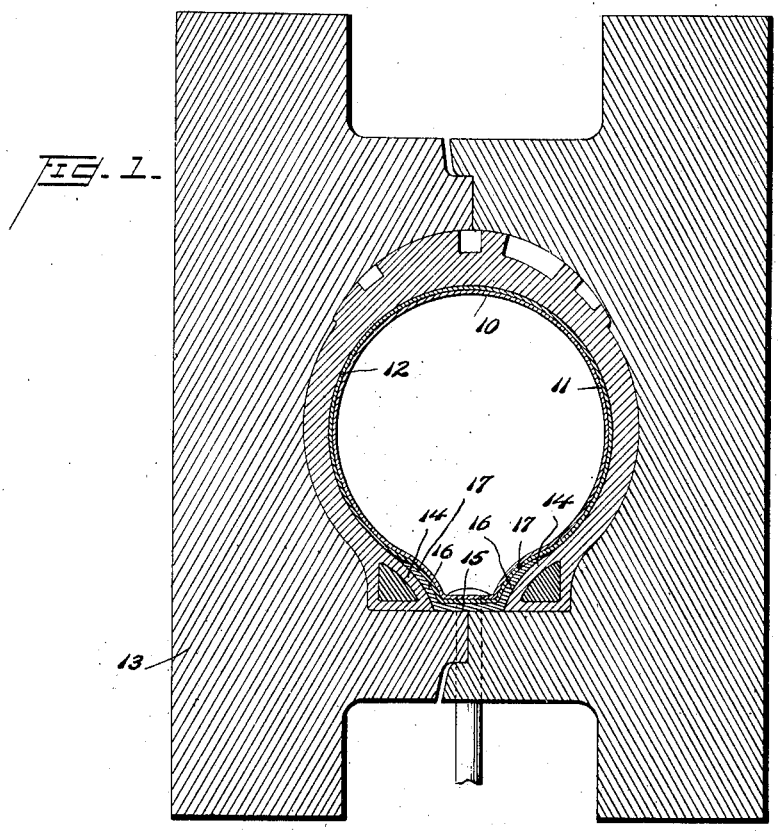
Figure 2:
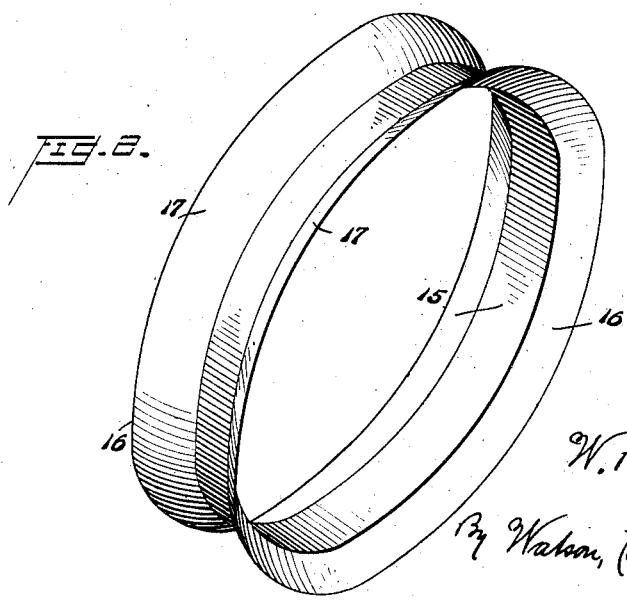

The objects and features of novelty will be apparent from the description taken in connection with the drawings in which:

Figure 1 is a transverse sectional view through a mold with a tire in position and illustrating a core constructed in accordance with the present invention; and Fig. 2 is a perspective view of the ring of the core.

As stated above, one of the principal objects of the invention is to provide a means for shaping the inner surfaces of the beads of the tire which provides sufficient rigidity and yet will yield to some extent. In the form of the invention shown the core comprises a bag 10 of substantially uniform thickness throughout, this bag being constructed in the usual way and consisting of an inner fabric layer 11 and an outer rubber layer 12. At the inner periphery of this bag is a more or less rigid member between which and the mold 13 are formed the beads 14 of the tire. According to this invention the member is in the form of a continuous ring of channel shape in cross section. Thus the base 15 of the channel is cylindrical and at its ends has the outwardly extending flaring flanges 16. The base is relatively thin and the flanges are of substantially the same thickness, the object being to have the flanges of such strength that if excessive pressure comes on the same they may spring slightly so that no ridges will be formed on the interior surface of the tire at the peripheries of the flanges. As clearly shown in the drawings the interior surfaces 17 of the flanges are so shaped as to form a smooth continuation of the interior surface of the tire. Because of this construction the bag is not subjected to any sharp turns or corners at the peripheries of the flanges. Hence the bag exerts a pressure on the tire at the peripheries of the flanges, which was not possible in the old constructions because of the sharp turns which occurred in the bag at these points.

Preferably, the air bag is secured to the ring in any suitable manner. Thus the rubber layer of the air bag may be placed on the fabric layer and the folds stretched over the ring and then cured in the assembled position. Of course the bag might be secured to the ring in any other suitable way.

It will be observed that the flanges 16 are so shaped as to form the interior surfaces of the beads and yet are not so rigid as to permit formation of the ridges previously described. Furthermore, the entire core, that is the bag and the ring, is so light that it may be handled easily and may be inserted inside of the raw tire with a minimum of labor.

Having thus described the invention what is claimed as new and desired to be secured by Letters Patent is:

1. A core for use in curing pneumatic tires comprising an air bag having a ring at its inner periphery, said ring comprising a base portion of uniform diameter and a pair of spaced outwardly projecting flanges, said flanges diverging outwardly and being spaced and shaped to provide outer surfaces between which and the mold the beads are formed.

2. A core for use in curing pneumatic tires comprising an air bag having a ring at its inner periphery, said ring including two outwardly diverging spring flanges, spaced and shaped to provide surfaces between which and the mold the beads are formed.

3. A core for use in curing pneumatic tires comprising an air bag having a ring at its inner periphery, said ring comprising a cylindrical base portion of substantially uniform thickness having outwardly diverging flanges at its ends of substantially the same thickness as the base, said flanges being shaped to provide surfaces between which and the mold the beads are formed.

4. A core for use in curing pneumatic tires comprising an air bag having a ring at its inner periphery, said ring comprising a thin cylindrical base portion having outwardly diverging flanges at its ends, the outer surfaces of said flanges adapted to form the inner surfaces of the tire beads, and said flanges having the inner surfaces thereof at the peripheries of the flanges formed to smoothly join the inner surface of the tire.

5. A core for use in curing pneumatic tires comprising an air bag having a ring at its inner periphery, said ring being of channel shape in cross section, the flanges thereof flaring outwardly and shaped to be disposed between the beads of the tire and form the interior surfaces thereof, said flanges being of a thickness to spring inwardly under excessive pressure.

6. A core for use in curing pneumatic tires comprising an air bag having an annular member at its inner periphery, said member having symmetrically disposed elements straddling the bag and shaped to form the interior surfaces of the beads and constructed to yield inwardly under excessive pressure.

7. A core for use in curing pneumatic tires comprising an air bag having an annular member at its inner periphery, said member having symmetrically disposed elements straddling the bag and shaped to form the interior surfaces of the beads and constructed to yield inwardly under excessive pressure, the inner surfaces of said elements smoothly joining the interior surface of the tire.

8. A core for use in curing pneumatic tires comprising an air bag of substantially uniform thickness throughout, a metallic annular member at its inner periphery having symmetrically disposed spring elements straddling the bag and shaped to form the interior surfaces of the beads and constructed to yield under excessive pressure.

9. A core for use in curing pneumatic tires comprising an air bag of substantially uniform thickness throughout, a ring at its inner periphery of channel shape in cross section, the flanges thereof flaring outwardly and shaped to be disposed between the beads of the tire and form the interior surfaces thereof.

In testimony whereof I affix my signature.

WALTER R. DENMAN.